United States Patent [19]

Cashion

[11] 3,744,594
[45] July 10, 1973

[54] MECHANICAL BRAKES
[76] Inventor: Charles Ward Cashion, P.O. Box 306, Waurika, Okla. 73573
[22] Filed: Nov. 17, 1971
[21] Appl. No.: 199,610

[52] U.S. Cl. ................................. 188/76
[51] Int. Cl. .......................... F16d 53/00
[58] Field of Search ...................... 188/74, 76, 78 R

[56] References Cited
UNITED STATES PATENTS
2,265,578  12/1941  Rosenberg ............................ 188/76
2,285,241  6/1942  Walther et al. ........................ 188/76

Primary Examiner—Duane A. Reger
Attorney—Wayland D. Keith

[57] ABSTRACT

A brake mechanism having pairs of arcuate brake shoes pivotally mounted near the outer end of a pivoted lever to simultaneously engage the inner and outer cylindrical surfaces upon application of power, either mechanical or hydraulic, to the brake lever, so as to grip a cylindrical brake drum to retard the rotation thereof. Provision is made to resiliently balance the brake shoes in a central position out of contact with the cylindrical surfaces of the brake drum. It is preferable to have a pair of such pivoted levers within a brake drum, which are operated independently by hydraulic cylinders, so if one cylinder becomes inoperative, the effectiveness of the other cylinder would not be impaired. The arcuate brake shoes are circumferentially spaced apart to permit a certain degree of self energization and to minimize heat transfer.

3 Claims, 4 Drawing Figures

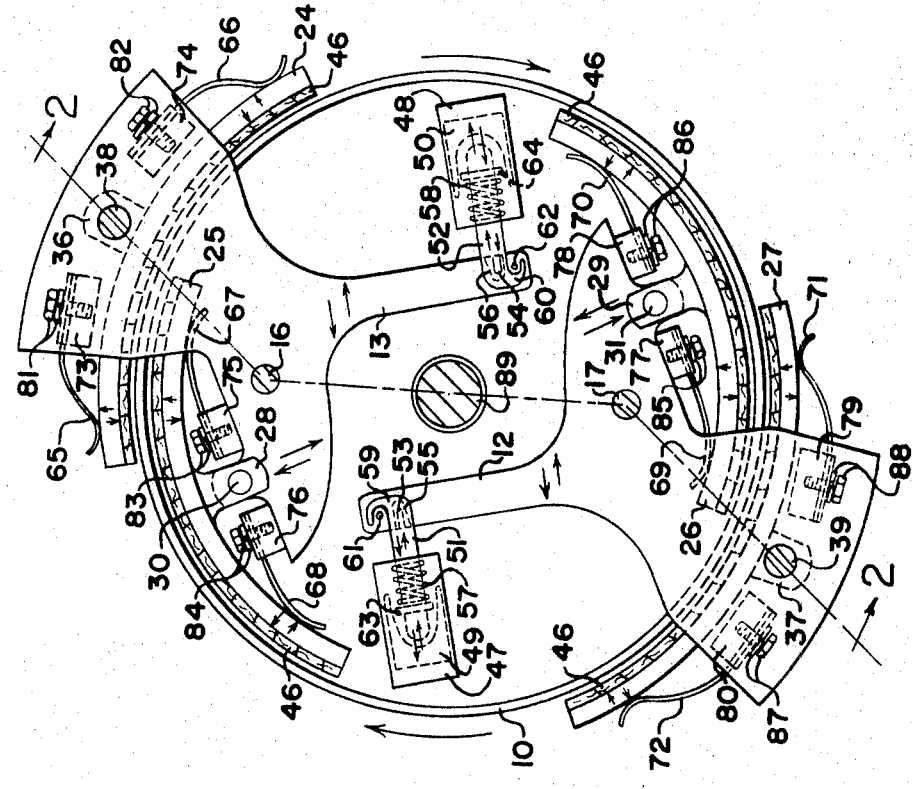

MECHANICAL BRAKES

This invention relates to an improved mechanical brake for mobile and stationary equipment and the principal object of the invention is to provide a brake, so constructed, that it shall provide increased braking surface and prove superior in power over brakes of conventional design.

Another object of the invention is not only to provide comparatively simpler construction and design, with parts few in number, stronger and more durable and not liable to easily get out of order; but, to provide a brake which can be assembly-line produced.

Another object of the invention in addition to its use on automobiles, trucks and tractors, is to provide a mechanical brake for heavy equipment, namely:— winches, dirt movers, swamp buggies, rotary and cable tool drilling rigs for oil and water, draglines, construction cranes and all other forms of equipment employing the use of cable drums and reels and requiring mechanical brakes.

Another object of the invention is to have a brake of simple design, practical and sturdy, bearing in mind that its operation shall be efficient and insure maximum safety for motor vehicles so equipped.

This invention is illustrated in the accompanying drawings, wherein:

FIG. 1 is a frontal or open-face view of the improved brake, taken on the line 1—1 of FIG. 2, looking in the direction indicated by the arrows, with parts being shown in section and other parts being shown broadside of the left brake as it appears in the brake drum; also, showing the direction of movement of the brake shoes with respect to the brake drum.

FIG. 2 is a sectional view taken on the line 2—2 of FIG. 1, looking in the direction indicated by the arrows, parts being being shown in section and parts being shown in elevation of the fixed and moving parts of the brake, showing the manner in which they are fastened to the housing or reel standard.

Figure 4:
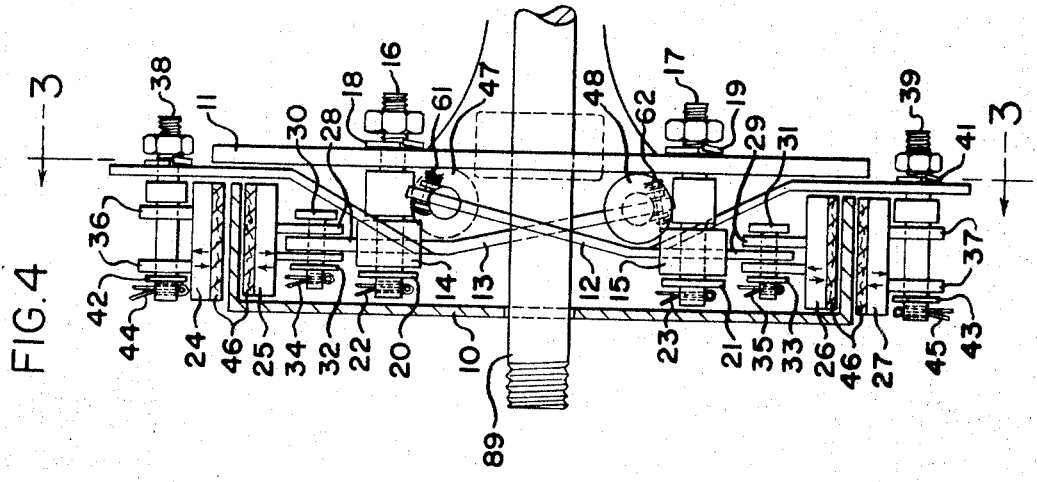
FIG. 4 is a sectional view taken on the line 4—4 of FIG. 3, looking in the direction indicated by the arrows, with parts being shown in section, and parts being shown in elevation of the fixed and moving parts of the brake, showing the manner in which they are fastened to the housing or reel standard.

The brake consists of two brake levers or arms 12 and 13 with enlarged brackets or hubs 14 and 15, FIG. 2 and FIG. 4, pivoting on shoulder bolts 16 and 17, FIG. 2 and FIG. 4, bolted to the housing or reel standard 11, FIG. 2 and FIG. 4, with lock-washers 18 and 19, FIG. 2 and FIG. 4, — washers 20 and 21, FIG. 2 and FIG. 4 and secured by cotter keys 22 and 23, FIG. 2 and FIG. 4. — It is to be noted that shoulder bolts 16 and 17 form a fulcrum for each of the brake levers 12 and 13. These brake arms shall be fashioned from sheet steel of sufficient thickness to insure proper strength and durability.

The brake shoes 24, 25, 26 and 27 shall also be of sheet steel of sufficient thickness to insure proper strength and durability and positioned as follows:—

Two brake shoes 24 and 27 on the outside of brake drum 10 and two brake shoes 25 and 26 on the inside of brake drum 10, allowing braking or retarding pressure on both sides of brake drum 10.

The inner brake shoes 25 and 26 are attached to brake arms 12 and 13 by means of clevis or hinge joints 28 and 29 and held together by pins 30 and 31, FIG. 2 and FIG. 4, — with washers 32 and 33, FIG. 2 and FIG. 4 and secured by cotter keys 34 and 35, FIG. 2 and FIG. 4.

The outer brake shoes 24 and 27 are attached to brake arms 12 and 13 by means of two upright brackets 36 and 37 welded to brake shoes 24 and 27 and bolted to brake arms 12 and 13 with shoulder bolts 38 and 39, FIG. 2 and FIG. 4 — with lock-washers 40 and 41, FIG. 2 and FIG. 4, — washers 42 and 43, FIG. 2 and FIG. 4 and secured by cotter keys 44 and 45, FIG. 2 and FIG. 4.

Depending upon engineering requirements, brake lining 46 may be riveted or vulcanized to brake shoes 24, 25, 26 and 27.

The brake is activated by hydraulic process, viz: Hydraulic brake fluid forced into hydraulic cylinders 47 and 48, moving pistons 49 and 50 against plungers 51 and 52 which are connected to brake arms 12 and 13. This action in turn, pushes brake arms 12 and 13 inward toward axle assembly 89, causing brake shoes 24, 25, 26 and 27 to close upon both sides of brake drum 10 thus completing the braking action.

The ends of plungers 51 and 52, where they join brake arms 12 and 13, are divided to form a clevis or yoke which fits onto brake arms 12 and 13; specifically, these plungers have tenons or "tongues" 53 and 54 within the yoke or clevis, which dovetail into mortises or slots 55 and 56 in brake arms 12 and 13.

When the brake has been activated and as soon as the braking action is complete, the brake arms and brake shoes are released by a retrieving action whereby the tension coil springs 57 and 58 immediately recoil to withdraw plungers 51 and 52 thereby retracting brake arms 12 and 13 and brake shoes 24, 25, 26 and 27 by means of plunger hooks 59 and 60 engaging pins 61 and 62 positioned in brake arms 12 and 13 as illustrated. Coil springs 57 and 58 are held in place on plungers 51 and 52 by machined or welded lips 63 abd 64.

Figure 3:
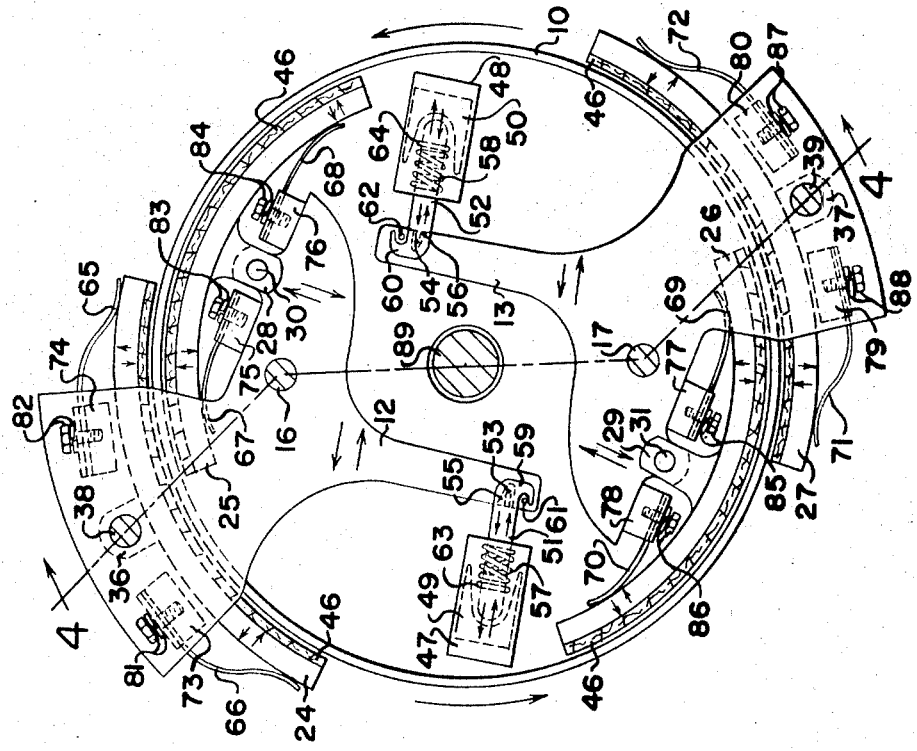
FIG. 3 is a frontal or open-face view of the improved brake, sectional view taken on the line 3—3 of FIG. 4, looking in the direction indicated by the arrows, with parts being shown in section, and other parts being shown broadside of the right brake as it appears in the brake drum; also, showing the direction of movement of the brake shoes with respect to the brake drum.

The flat tempered springs 65, 66, 67, 68, 69, 70, 71 and 72 are positioned as illustrated so as to insure equalized brake shoe pressure on brake drum 10 and are fastened to brake arms 12 and 13 by means of slotted and threaded blocks 73, 74, 75, 76, 77, 78, 79 and 80 welded to brake arms 12 and 13. The flat tempered springs are held in place by bolts and lock-washers 81, 82, 83, 84, 85, 86, 87 and 88 as illustrated in FIG. 1 and FIG. 3. It is to be noted that coil springs may be used instead of flat springs at positions 65, 66, 67, 68, 69, 70, 71 and 72.

What is claimed is:

1. A brake mechanism for engaging inner and outer cylindrical surfaces of a brake drum, which mechanism comprises;

a. an upstanding, non-rotatable housing, b. a single lever pivotally mounted on a side of said housing, c. a pair of spaced apart pivot pins mounted on said lever near the outer end thereof, 1. a concave, arcuate brake shoe pivotally mounted on one of said pivot pins in complementary relation to the outer surface of said cylindrical brake drum, and being selfequalizing with respect thereto when in engaged position,
2. a convex arcuate brake shoe pivotally mounted on the other of said pivot pins in complementary relation to the inner cylindrical surface of said brake drum and being selfequalizing with respect thereto when in engaged position,
3. said brake shoes being simultaneously engageable with the cylindrical surfaces of the brake drum upon movement of said single lever about said pivot mounting on said housing,
d. said arcuate brake shoes being simultaneously disengageable from the cylindrical surfaces of said brake drum when said brake lever is moved about said pivot mounting on said housing,
e. power means mounted on said housing and being interconnected with said lever, near the opposite end thereof to selectively actuate said lever about the pivot mounting thereof on the side of said housing to simultaneously engage said arcuate brake shoes with the cylindrical surfaces of said brake drum, when said lever is in one position and to simultaneously disengage said arcuate brake shoes from the cylindrical surfaces of said brake drum when in another position upon being moved about said pivot mounting on said housing.

2. A brake mechanism for engaging inner and outer cylindrical surfaces of a brake drum, as defined in claim 1; wherein
   a. said pivots of said arcuate brake shoes being circumferentially spaced with respect to the axis of said cylindrical brake drum,
   b. springs mounted on said lever, one on each side of said respective pivot pins and being in bearing engagement with said respective arcuate brake shoes to maintain said arcuate brake shoes in spaced relation from the surfaces of said brake drum when the arcuate brake shoes are in disengaged position.

3. A brake mechanism for engaging inner and outer cylindrical surfaces of a brake drum, which mechanism comprises:
   a. an upstanding, non-rotatable housing,
   b. at least one lever pivotally mounted on said housing,
   c. a pair of arcuate brake shoes mounted on said lever near the outer end thereof,
   d. one of said arcuate brake shoes being engageable with the outer circumference of the cylindrical brake drum and the other of said brake shoes being engageable with the inner surface of the cylindrical brake drum when said lever is moved to one position,
   e. said arcuate brake shoes being disengageable from the cylindrical surfaces when said brake lever is moved to another position,
   f. power means comprising a hydraulic cylinder-plunger mounted on said housing and being interconnected with said lever near the inner end thereof to selectively actuate said lever to simultaneously engage said brake shoes with the cylindrical surfaces of the brake drum,
   g. resilient means interconnected with said power means to, simultaneously disengage said brake shoes from said cylindrical surfaces of the brake drum,
   h. tenon and yoke means interconnecting said brake lever and the plunger of said cylinder, to move said brake lever in one direction upon application of hydraulic pressure by said hydraulic cylinder, and
   i. hook and pin connection means between said lever and said plunger to move said lever in an opposite direction, upon release of pressure from said hydraulic cylinder.

* * * * *